Sept. 20, 1932.   V. CONTINSOUZA ET AL   1,878,381
CINEMATOGRAPH
Filed June 11, 1929
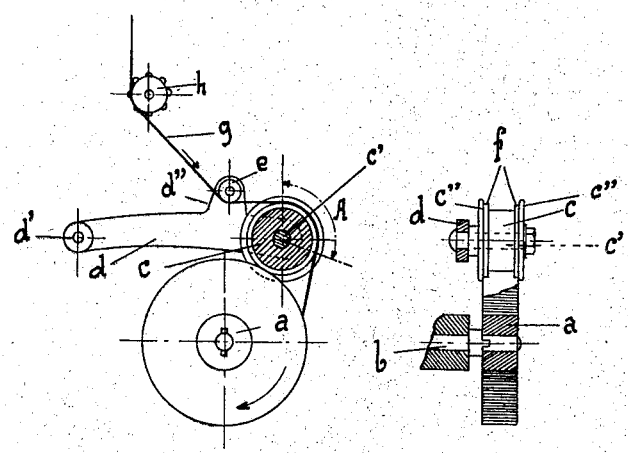

Patented Sept. 20, 1932

1,878,381

UNITED STATES PATENT OFFICE

VICTOR CONTINSOUZA AND MAURICE BAPTISTE COMBES, OF PARIS, FRANCE

CINEMATOGRAPH

Application filed June 11, 1929, Serial No. 369,944, and in France June 16, 1928.

The present invention relates to mechanisms serving to wind moving picture films after projection. It concerns more particularly those of such mechanisms in which a pressure roller, in contact with the roll of film being formed, assures the tightening of the successive turns of the film. This roller is in general provided with cheeks, in a way to guide the film transversely in order to obtain a perfectly plane roll without it being necessary to produce the winding between two cheeks.

The pressure roller can be driven by the roll of film, itself driven through the medium of a friction device mounted on its winding shaft, or else the said roller can control the roller which turns then independently of its winding shaft.

Whichever be the case, the pressure roller and the roll of film turn in the opposite direction and the film to be wound pass between them.

Under these conditions, the tension exerted on the film, for assuring the tightening of the turns of the roll which is forms becomes noticeable up to the toothed drum or outlet feeder of the apparatus, and the perforate edges of the film are subjected by this fact itself to a large fatigue.

According to the present invention, this disadvantage is eliminated in a very simple manner by causing the film being wound to pass over the pressure roller in a region which is opposed to that where the roller comes in contact with the roll of the film.

The film which goes to unwind therefore embraces a certain arc of the periphery of the roller in a region where this periphery is displaced in a direction opposite to the film.

There results between the roller and the film a friction which has for effect to expand the film between the feeding drum at the outlet and the pressure roller while stretching it strongly between the latter and the roll of film.

Applied to a moving picture machine having continuous movement of the film, the winding device, the subject of the invention, allows the elimination of one of these outlet feeding drums, without injury to the fixity of projection.

The accompanying drawing, by way of example, shows one of the embodiments of the object of the invention.

Fig. 1 is a side view.

Fig. 2 is the corresponding front view with partial section.

Fig. 3 shows diagrammatically the disposition of an ordinary moving picture machine having continuous film movement.

Fig. 4 illustrates the same apparatus provided with a winding device according to the invention and a single outlet feeder.

According to Figs. 1 and 2, the core $a$ on which winds the projected film is rendered rigid with the arbor $b$ which is driven by a friction device as is known.

The pressure roller $c$ is mounted loosely on a shaft $c'$ which carries, near one of its extremities an arm $d$, pivoted at its other extremity at $d'$ on the frame.

Between these two points, the arm $d$ forms a transverse arm $d''$ which is provided with a shaft upon which is loosely mounted a small roller $e$, parallel to $c$. Finally, the shaft of the roller $e$ can be rendered displaceable transversely to arm $d$, for example in a slot of this arm. It is then provided with means which allow fixing it in the desired position.

The pressure roller $c$ is provided with cheeks $c''$ against which abut rings of rubber or the equivalent $f$, fitted over the body of the said roller.

The film $g$ issuing from the outlet feeder $h$ of the moving picture machine, passes beneath the small roller $e$, then over the roller $c$ in the region opposite to the point of contact of this roller with the roll of film.

The roller $e$ has for its purpose to increase the arc A embraced by the film on the periphery of the roller $c$.

Thus as it has been previously indicated, the roller $c$ expands the film between $h$ and $c$. The moving picture apparatuses in which the film is displaced in a continuous movement have in general the disposition indicated diagrammatically in Fig. 3.

The film $g$ to be projected is unrolled from the spool $i$, passes over a non-toothed loose roller $j$, then before the projecting window. It is driven by a main toothed feeding drum $k$, followed by another analogous drum $l$. The film forms a loop between these two drums and winds on $m$ after having left the latter.

With the usual mechanisms for winding projected film, it is necessary to utilize thus two outlet feeding drums in order to prevent the winding tension from becoming noticeable on the main feeder, which would cause a fault in the fixity of projection.

When the moving picture machine is provided with a winder according to the invention, the second feeder $l$ can be eliminated without inconvenience which greatly simplifies the apparatus (Fig. 4).

It is to be understood that the invention is not strictly limited to that which has been described and illustrated, but that it may give way to modifications.

We claim:

1. A process for winding a moving picture film after projection, which comprises placing a pressure roller in contact with the film roll, and causing the said film to embrace a part of the periphery of the pressure roller in a region which is opposed to that where said roller is in contact with the said roll of film.

2. A winding device for moving picture films which comprises in combination, a toothed film feed roller, a wind-up film reel, and a smooth roller between said feed roller and said reel adapted to be applied against said reel, said smooth roller being so disposed as to cause the film to be applied over a substantial arc of its periphery in the portion thereof which is opposed to that along which said smooth roller is in contact with said reel.

3. A winding device for moving picture films which comprises in combination, a toothed feed roller, a wind-up film reel, a smooth roller between said feed roller and said reel adapted to be applied against said reel, said smooth roller being so disposed as to cause the film to be applied over a substantial arc of its periphery in the portion thereof which is opposed to that along which said smooth roller is in contact with said reel, and means for increasing the length of the arc along which said film is applied upon said smooth roller.

4. A winding device for motion picture films which comprises in combination, a toother feed roller, a wind-up film reel, an arm adapted to pivot about an axis parallel to the axis of said reel, a smooth roller adapted to rotate freely on said arm, located between said feed roller and said reel and adapted to be applied against said reel, said smooth roller being so disposed as to cause said film to be applied over a substantial arc of its periphery in the portion thereof which is opposed to that along which said smooth roller is in contact with said reel.

5. A winding device for motion picture films which comprises in combination, a toothed feed roller, a wind-up film reel, an arm adapted to pivot about an axis parallel to the axis of said reel, a smooth roller adapted to rotate freely on said arm, located between said feed roller and said reel and adapted to be applied against said reel, said smooth roller being so disposed as to cause said film to be applied over a substantial arc of its periphery in the portion thereof which is opposed to that along which said roller is in contact with said reel, and means on said arm for increasing the length of the arc along which said film is applied upon said smooth roller.

6. A winding device for moving picture films which comprises in combination, a toothed feed roller, a wind-up film reel, an arm adapted to pivot about an axis parallel to the axis of said reel, a smooth roller adapted to rotate freely on said arm, located between said feed roller and said reel and adapted to be applied against said reel, said smooth roller being so disposed as to cause said film to be applied over a substantial arc of its periphery in the portion thereof which is opposed to that along which said roller is in contact with said reel, and another smooth roller journalled on said arm adapted to engage said film for increasing the length of the arc along which said film is applied upon said smooth roller.

7. A winding device for motion picture films which comprises in combination, a toothed feed roller, a wind-up film reel, an arm adapted to pivot about an axis parallel to the axis of said reel, a smooth roller adapted to rotate freely on said arm, located between said feed roller and said reel and adapted to be applied against said reel, said smooth roller being so disposed as to cause said film to be applied over a substantial arc of its periphery in the portion thereof which is opposed to that along which said smooth roller is in contact with said reel, and cheeks on said smooth roller for guiding the film.

8. A winding device according to claim 7 in which the outer periphery of the smooth roller has a high coefficient of friction.

In testimony whereof we have signed this specification.

VICTOR CONTINSOUZA.
MAURICE BAPTISTE COMBES.